(12) United States Patent
Odell

(10) Patent No.: US 11,563,382 B2
(45) Date of Patent: *Jan. 24, 2023

(54) INDUCTIVE CHARGING CIRCUIT TO PROVIDE OPERATING POWER FOR A CONTROLLER

(71) Applicant: Power Integrations, Inc., San Jose, CA (US)

(72) Inventor: Arthur B. Odell, Morgan Hill, CA (US)

(73) Assignee: POWER INTEGRATIONS, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/544,887

(22) Filed: Dec. 7, 2021

(65) Prior Publication Data

US 2022/0103084 A1 Mar. 31, 2022

Related U.S. Application Data

(63) Continuation of application No. 16/795,100, filed on Feb. 19, 2020, now Pat. No. 11,258,369.

(51) Int. Cl.
*H02M 3/335* (2006.01)
*H02J 50/12* (2016.01)

(52) U.S. Cl.
CPC ......... *H02M 3/33592* (2013.01); *H02J 50/12* (2016.02); *H02M 3/33507* (2013.01)

(58) Field of Classification Search
CPC . H02M 3/33592; H02M 3/33507; H02J 50/12
See application file for complete search history.

(56) References Cited

U.S. PATENT DOCUMENTS

| 5,285,369 A | 2/1994 | Balakrishnan |
| 5,313,381 A | 5/1994 | Balakrishnan |

(Continued)

FOREIGN PATENT DOCUMENTS

| CN | 113131744 A | 7/2021 | |
| JP | 2003158872 A | * 5/2003 | .......... H02M 3/1563 |

(Continued)

OTHER PUBLICATIONS

U.S. Appl. No. 16/792,132, "Final Office Action dated Dec. 10, 2021," 22 pages.

(Continued)

*Primary Examiner* — Sisay G Tiku
(74) *Attorney, Agent, or Firm* — Power Integrations, Inc.; Karina Martha G. Li

(57) ABSTRACT

An inductive charging circuit coupled to a winding of a power converter and a supply terminal of a controller of the power converter. The inductive charging circuit comprising an input coupled to the winding, the input coupled to receive a switching voltage generated by the power converter, an inductor coupled to the input to provide an inductor current in response to the switching voltage, a first diode coupled to the inductor to enable the inductor current to flow from the input of the inductive charging circuit to an output of the inductive charging circuit; and the output of the inductive charging circuit coupled to the supply terminal of the controller, the output of the inductive charging circuit configured to provide an operational current responsive to the switching voltage, the controller is configured to control a power switch of the power converter to generate the switching voltage.

15 Claims, 9 Drawing Sheets

(56) References Cited

U.S. PATENT DOCUMENTS

| | | | |
|---|---|---|---|
| 5,424,932 A | 6/1995 | Inou et al. | |
| 6,462,971 B1 | 10/2002 | Balakrishnan et al. | |
| 6,525,514 B1 | 2/2003 | Balakrishnan et al. | |
| 6,775,155 B2 | 8/2004 | Park | |
| 7,157,813 B2 | 1/2007 | Djenguerian et al. | |
| 7,425,834 B2 | 9/2008 | Matthews et al. | |
| 7,576,528 B2 | 8/2009 | Wang et al. | |
| 7,952,895 B2 | 5/2011 | Matthews et al. | |
| 7,995,359 B2 | 8/2011 | Djenguerian et al. | |
| 8,063,622 B2 | 11/2011 | Kung et al. | |
| 8,077,483 B2 | 12/2011 | Djenguerian et al. | |
| 8,225,111 B2 | 7/2012 | Bailey et al. | |
| 8,243,477 B2 | 8/2012 | Polivka et al. | |
| 8,385,088 B2 | 2/2013 | Bailey et al. | |
| 9,019,728 B2 | 4/2015 | Matthews et al. | |
| 9,036,369 B2 | 5/2015 | Mayell et al. | |
| 9,178,411 B2 | 11/2015 | Djenguerian et al. | |
| 9,331,587 B2 | 5/2016 | Djenguerian et al. | |
| 9,479,065 B2 | 10/2016 | Mao et al. | |
| 9,667,154 B2 | 5/2017 | Colbeck | |
| 9,866,122 B2 | 1/2018 | Werner et al. | |
| 10,033,284 B2 | 7/2018 | Werner et al. | |
| 10,186,976 B2 | 1/2019 | Duvnjak | |
| 10,291,136 B2 | 5/2019 | Song et al. | |
| 10,326,306 B2 | 6/2019 | Peter et al. | |
| 2003/0076078 A1 | 4/2003 | Balakrishnan et al. | |
| 2003/0090253 A1* | 5/2003 | Balakrishnan | H02M 3/338 323/282 |
| 2003/0132738 A1* | 7/2003 | Balakrishnan | H02M 3/33507 323/282 |
| 2005/0088161 A1* | 4/2005 | Balakrishnan | H02M 3/156 323/284 |
| 2006/0028190 A1* | 2/2006 | Balakrishnan | H02M 3/156 323/284 |
| 2006/0176039 A1* | 8/2006 | Balakrishnan | H02M 3/338 323/285 |
| 2007/0035285 A1* | 2/2007 | Balakrishnan | H02M 3/33507 323/284 |
| 2007/0159152 A1* | 7/2007 | Balakrishnan | H02M 3/338 323/285 |
| 2010/0327838 A1 | 12/2010 | Melanson | |
| 2011/0305043 A1 | 12/2011 | Matsumoto | |
| 2013/0093403 A1 | 4/2013 | Jia et al. | |
| 2013/0155728 A1 | 6/2013 | Melanson et al. | |
| 2016/0151637 A1 | 6/2016 | Abe et al. | |
| 2020/0021284 A1 | 1/2020 | Thalheim | |
| 2020/0112266 A1* | 4/2020 | Hara | H02M 1/36 |
| 2021/0203235 A1 | 7/2021 | Odell et al. | |
| 2021/0257923 A1 | 8/2021 | Odell | |
| 2021/0328516 A1 | 10/2021 | Balakrishnan et al. | |

FOREIGN PATENT DOCUMENTS

| | | |
|---|---|---|
| WO | 2017095408 A1 | 6/2017 |
| WO | 2020242440 A1 | 12/2020 |

OTHER PUBLICATIONS

U.S. Appl. No. 16/792,132; "Non-Final Office Action;" dated Jul. 7, 2021, 20 pages.

Song, et al., "Comparison between Control Methods of Active Clamp Flyback for Adaptor Application," 2018 IEEE International Power Electronics and Application Conference and Exposition (PEAC), Shenzhen, China, 2018, pp. 1-6, 2018.

* cited by examiner

INDUCTIVE CHARGING CIRCUIT TO PROVIDE OPERATING POWER FOR A CONTROLLER

This application is a continuation of U.S. patent application Ser. No. 16/795,100, filed Feb. 19, 2020, now U.S. patent application Ser. No. 16/795,100 is hereby incorporated by reference in its entirety.

BACKGROUND OF THE INVENTION

1. Field of the Invention

The present disclosure relates generally to power converters, and more particularly, to controllers for power converters.

2. Discussion of the Related Art

Electronic devices use power to operate. Switched mode power converters are commonly used due to their high efficiency, small size and low weight to power many of today's electronics. Conventional wall sockets provide a high voltage alternating current. In a switching power converter, a high voltage alternating current (ac) input is converted to provide a well-regulated direct current (dc) output through an energy transfer element. The switched mode power converter controller usually provides output regulation by sensing one or more signals representative of one or more output quantities and controlling the output in a closed loop. In operation, a switch is utilized to provide the desired output by varying the duty cycle (typically the ratio of the on time of the switch to the total switching period), varying the switching frequency, or varying the number of pulses per unit time of the switch in a switched mode power converter.

Power converters generally include one or more controllers which sense and regulate the output of the power converter. These controllers generally require a regulated or unregulated voltage source to power the circuit components of the controller. A bypass capacitor coupled to a controller may provide operating power to the circuits of the controller.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
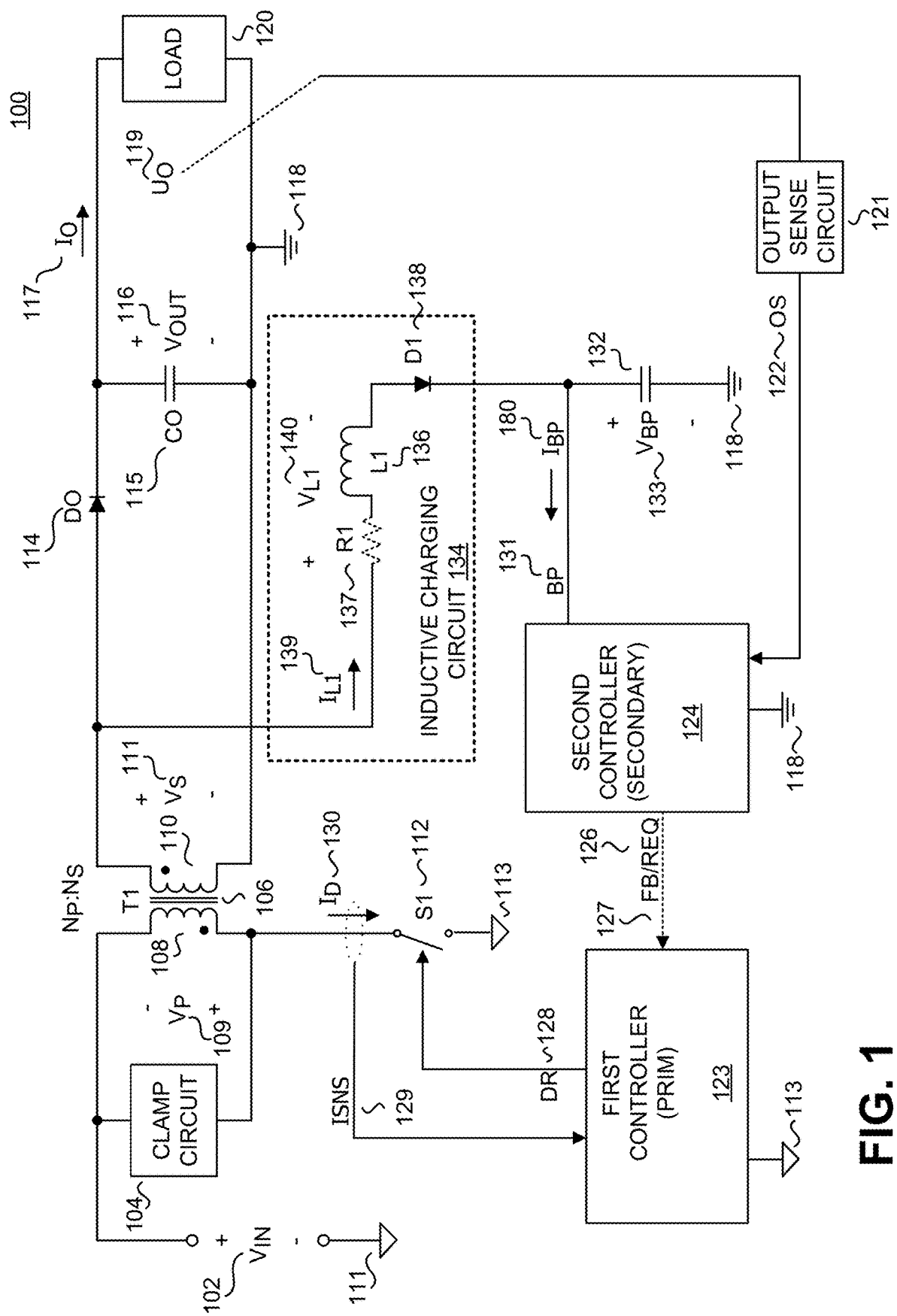
FIG. 1 is a schematic diagram of an example isolated power converter including an inductive charging circuit, in accordance with embodiments of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Power converters can include one or more controllers which sense and regulate the output of the power converter. These controllers generally require a regulated or unregulated voltage source to power the circuit components of the controller. A bypass terminal with a bypass capacitor coupled to a controller may provide operating power to the circuits of the controller.

An isolated power converter may include a primary controller and a secondary controller which are galvanically isolated from one another by an energy transfer element (e.g., a coupled inductor, transformer, etc.). In other words, a dc voltage applied between input side and output side of the power converter will produce substantially zero current.

The primary controller is configured to control a power switch on the primary side of the isolated power converter to control the transfer of energy from the primary winding of the energy transfer element to the secondary winding of the energy transfer element. The secondary controller is coupled to circuit components on the secondary side of the isolated power converter. The secondary controller may also be configured to control a secondary switch coupled to the secondary winding of the energy transfer element, such as a transistor used as a synchronous rectifier for the power converter. Although the primary controller and the secondary controller are galvanically isolated from one another, the secondary controller may transmit a signal to the primary controller. The signal may provide the primary controller with information regarding the output of the power converter (such as a feedback signal) and/or controls how the primary controller switches the power switch to transfer energy to the secondary side (such as a request signal).

The secondary controller could include a bypass terminal with a bypass capacitor on the secondary side of the power converter. The bypass terminal can receive operating power to power circuits of the secondary controller. The secondary controller is coupled to the bypass capacitor and generally includes a linear regulator in order to regulate the bypass voltage across the bypass capacitor at a sufficient level to operate circuits of the secondary controller. For example, the bypass voltage may be regulated to substantially 4.4 volts (V).

In general, the source which charges the bypass capacitor may be significantly higher than the operational level for the bypass voltage. In addition, the source may also be quite variable. For example, the output voltage of the power converter may be utilized to charge the bypass capacitor to a sufficient level to operate the secondary controller. However, for some applications, the output voltage of the power converter may be between 20-30 V and sometimes can reach levels upwards of 40 V. Charge pumps and linear regulators may be utilized to charge the bypass capacitor from a high voltage source, such as the output voltage to the much lower bypass voltage and provide the average bypass current which is used to supply the internal circuits of the secondary controller. However, utilization of circuits such as charge pumps and linear regulators can result in excessive dissipation and increased thermals, which can adversely affect the efficiency of the power converter.

Embodiments of the present disclosure utilize an inductive charging circuit to filter a switching input voltage generated by the power converter to provide the average bypass current and operational power for a controller of the power converter. The inductive charging circuit limits the peak current provided by the inductive charging circuit and as such limits the losses of providing the average bypass current and operational power for the controller. This may reduce the dissipation and thermals as compared to charge pumps and linear regulators for providing operational power. In one example, the inductive charging circuit can derive the bypass current for a bypass terminal of a secondary controller from a switching voltage of an output winding of an energy transfer element of the power converter. In another example, the inductive charging circuit can derive the bypass current for a bypass terminal of a primary controller from a switching voltage of a bias winding of an energy transfer element of the power converter. For both of these examples, the switching voltage of the output winding or the bias winding voltage is generated by the power converter during operation of the power converter. In one example, the switching voltage is a pulsed voltage responsive to the turning on and off of a power switch of the power converter.

In one example, the inductive charging circuit includes an inductor and a diode coupled to the switching terminal of an output winding or a bias winding to receive a switching voltage. The output of the inductive charging circuit is coupled to a bypass terminal of a secondary or primary controller to provide operating current, operating voltage, and/or operating power to the circuits of the secondary or primary controller. In another example, the inductive charging circuit further includes a capacitor coupled to as a dc blocking element to filter dc current.

FIG. 1 illustrates an example power converter 100 including an inductive charging circuit 134 to provide bypass current $I_{BP}$ 180 for a bypass terminal BP 131, which provides supply to a second controller 124 (e.g. secondary controller) of the power converter 100, in accordance with an embodiment of the present disclosure. The second controller 124 and the inductive charging circuit 134 is further shown as coupled to a bypass capacitor 132 with bypass voltage $V_{BP}$ 133. The bypass capacitor 132 may filter the bypass current $I_{BP}$ 180 provided to the second controller 124. The illustrated power converter 100 includes a clamp circuit 104, energy transfer element T1 106, an input winding 108 of the energy transfer element T1 106, an output winding 110 of the energy transfer element T1 106, a power switch S1 112, an input return 113, an output rectifier DO 114, an output capacitor CO 115, an output sense circuit 121, a second controller 124, a first controller 123 (e.g. primary controller), a bypass capacitor 132 (e.g. supply capacitor for the second controller 124), and the inductive charging circuit 134. The inductive charging circuit 134 is shown as including an inductor L1 136 and diode D1 138. Further shown is resistor R1 137 in dashed lines, which may represent the parasitic resistance of inductor L1 136. Further, diode D1 138 may be coupled as a passive switch and it should be appreciated that other elements could be used. A communication link 127 between the second controller 124 and the first controller 123 is also illustrated.

Further shown in FIG. 1 are an input voltage $V_{IN}$ 102, an input winding voltage $V_P$ 109, an output winding voltage $V_S$ 111 an output voltage VOUT 116, an output current $I_O$ 117, an output quantity $U_O$ 119, an output sense signal OS 122, a request signal REQ or feedback signal FB 126, a bypass voltage $V_{BP}$ 133, a current sense signal ISNS 129, a switch current ID 130, a primary drive signal DR 128, an inductor current $I_{L1}$ 139, an inductor voltage $V_{L1}$ 140, and bypass current $I_{BP}$ 180.

In the illustrated example, the power converter 100 is shown as having a flyback topology. Further, the input of power converter 100 is galvanically isolated from the output of the power converter 100, such that input return 113 is galvanically isolated from output return 118. Since the input and output of power converter 100 are galvanically isolated, there is no direct current (dc) path across the isolation barrier of energy transfer element T1 106, or between input winding 108 and output winding 110, or between input return 113 and output return 118. It is appreciated that other known topologies and configurations of power converters may also benefit from the teachings of the present disclosure.

The power converter 100 provides output power to a load 120 from an unregulated input voltage $V_{IN}$ 102. In one embodiment, the input voltage $V_{IN}$ 102 is a rectified and filtered ac line voltage. In another embodiment, the input voltage $V_{IN}$ 102 is a dc input voltage. The input voltage $V_{IN}$ 102 is coupled to the energy transfer element 106. In some embodiments, the energy transfer element 106 may be a coupled inductor, transformer, or an inductor. The example energy transfer element 106 is shown as including two windings, an input winding 108 (also referred to as a primary winding) and an output winding 110 (also referred to as a secondary winding). However, the energy transfer element 106 may have more than two windings. The input winding 108 of the energy transfer element is further coupled to the power switch S1 112 and the power switch S1 112 is further coupled to input return 113. The voltage across the input winding 108 is denoted as input winding voltage $V_P$ 109 while the voltage across the output winding 110 is denoted as output winding voltage $V_S$ 111. Coupled across the input winding 108 is the clamp circuit 104. The clamp circuit 104 limits the maximum voltage on the power switch S1 112. Further, when the clamp circuit 104 includes active circuit components, such as a switch, the clamp circuit 104 may facilitate zero voltage switching of the power switch S1 112.

Output winding 110 is coupled to the output rectifier DO 114, which is exemplified as a diode. However, the output rectifier DO 114 may be exemplified as a transistor used as a synchronous rectifier as shown with respect to FIG. 3. Output capacitor CO 115 is shown as being coupled to the output rectifier DO 114 and the output return 118. The power converter 100 further includes circuitry to regulate the output quantity $U_O$ 119, which in one example may be the output voltage $V_{OUT}$ 116, output current $I_O$ 117, or a combination of the two. The output sense circuit 121 is configured to sense the output quantity $U_O$ 119 to provide the output sense signal OS 122, representative of the output of the power converter 100, to the second controller 124.

The second controller 124 is configured to output either the request signal REQ 126 or a feedback signal FB 126 in response to the output sense signal OS 122. For the example of a request signal REQ 126, the request signal REQ 126 is representative of a request to turn on the power switch S1 112. The request signal REQ 126 may include request events which are generated in response to the output sense signal OS 122. In one example, the second controller 124 is configured to compare the output sense signal OS 122 with a regulation reference. In response to the comparison, the second controller 124 may output a request event in the request signal REQ 126. The request signal REQ 126 may be a rectangular pulse waveform which pulses to a logic high value and quickly returns to a logic low value. The logic high pulses may be referred to as request events. In other embodiments it is understood that request signal REQ 126 could be an analog, continually varying signal, rather than a pulsed waveform, while still benefiting from the teachings of the present disclosure. For the example of a feedback signal FB 126, the feedback signal FB 126 may be representative of information regarding the output of the power converter 100. The second controller 124 may send the information regarding the output via the feedback signal FB 126 to the first controller 123.

The first controller 123 is coupled to receive a current sense signal ISNS 129 representative of the switch current ID 130 of the power switch S1 112 and the request signal REQ or feedback signal FB 126 through a communication link 127, shown as a dashed line, and outputs the primary drive signal DR 128. The first controller 123 provides the primary drive signal DR 128 to the power switch S1 112 to control various switching parameters of the power switch S1 112 to control the transfer of energy from the input of to the output of the power converter 100 through the energy transfer element 106. Example of such parameters include switching frequency (or switching period $T_{SW}$), duty cycle, on-time and off-times, or varying the number of pulses per unit time of the power switch S1 112. In addition, the power switch S1 112 may be controlled such that it has a fixed switching frequency or a variable switching frequency. In one embodiment, the primary drive signal DR 128 is a rectangular pulse waveform with varying durations of logic high and logic low sections, logic high sections corresponding to the power switch S1 112 being ON and logic low sections corresponding to the power switch S1 112 being OFF. In one embodiment, the first controller 123 outputs the primary drive signal DR 128 to turn ON the power switch S1 112 in response to a request event 199 in the request signal REQ 126 or to the information provided by the feedback signal FB 126. In one example, the first controller 123 outputs the primary drive signal DR 128 to turn OFF the power switch S1 112 when the switch current ID 130 provided by the current sense signal ISNS 129 reaches a current limit.

If the clamp circuit 104 includes active components, such as a transistor, the first controller 123 may also output a clamp drive signal (not shown). The clamp drive signal could control various switching parameters of a clamp switch included in the clamp circuit 104, such as the on-times or off-times of the clamp switch. In one example, in response to an indication to turn on the power switch S1 112 from the request signal REQ/feedback signal FB 126, the first controller 123 outputs the clamp drive signal to turn on the clamp switch for a duration which may be selected such that sufficient charge is provided from the clamp circuit 104 to the input winding 108 to discharge the parasitic capacitance of the power switch S1 112. Once the first controller 123 turns off the clamp switch of the clamp circuit 104, the first controller 123 outputs the primary drive signal DR 128 to turn on the power switch S1 112.

The second controller 124 and the first controller 123 may communicate via the communication link 127. For the example shown, the second controller 124 is coupled to the secondary side of the power converter 100 and is referenced to the output return 118 while the first controller 123 is coupled to the primary side of the power converter 100 and is referenced to the input return 113. In embodiments, the first controller 123 and the second controller 124 are galvanically isolated from one another and the communication link 127 provides galvanic isolation using an inductive coupling, such as a transformer or a coupled inductor, an optocoupler, capacitive coupling, or other device that maintains the isolation. However, it should be appreciated that in some embodiments, the second controller 124 is not galvanically isolated from the first controller 123. In one example, the communication link 127 may be an inductive coupling formed from a leadframe which supports the first controller 123 and/or the second controller 124.

In one example, the first controller 123 and second controller 124 may be formed as part of an integrated circuit that is manufactured as either a hybrid or monolithic integrated circuit. In one example, the power switch S1 112 may also be integrated in a single integrated circuit package with the first controller 123 and the second controller 124. In addition, in one example, first controller 123 and second controller 124 may be formed as separate integrated circuits. The power switch S1 112 may also be integrated in the same integrated circuit as the first controller 123 or could be formed on its own integrated circuit. Further, it should be appreciated that both the first controller 123, the second controller 124 and power switch S1 112 need not be included in a single package and may be implemented in separate controller packages or a combination of combined/separate packages.

It is generally understood that a switch that is closed may conduct current and is considered on, while a switch that is open cannot conduct current and is considered off. In one example, the power switch S1 112 may be a transistor such as a metal-oxide-semiconductor field-effect transistor (MOSFET), bipolar junction transistor (BJT), silicon carbide (SiC) based transistor, gallium nitride (GaN) based transistor, or an insulated-gate bipolar transistor (IGBT).

The power converter 100 further includes the inductive charging circuit 134 coupled to the output winding 110. As shown, the inductive charging circuit 134 is coupled to the switching terminal of the output winding 110, illustrated as the dot end of the output winding 110 for the example shown in FIG. 1. Further, the input of the inductive charging circuit 134 is coupled between the output winding 110 and the output rectifier DO 114. The inductive charging circuit 134 is further coupled to the bypass capacitor 132 and a bypass terminal BP 131 of the second controller 124. In embodiments, the inductive charging circuit 134 provides a bypass current $I_{BP}$ 180 from a switching voltage (e.g. the voltage at the switching terminal of the output winding 110, output winding voltage $V_S$ 111) of the power converter 100 to provide operational power. In embodiments, the switching voltage, e.g. the output winding voltage $V_S$ 111, is generated by the power converter 100 due to the operation of the power switch S1 112.

The inductive charging circuit 134 is shown as including the inductor L1 136 and diode D1 138. The resistor R1 137 is shown in dashed lines to illustrate the parasitic resistance of the inductor L1 136. Further, the diode D1 138 may be considered a passive switch and other elements could be utilized. As shown, the input to the inductive charging circuit 134 is coupled to the output winding 110 such that the input of the inductive charging circuit 134 receives a switching voltage, the output winding voltage $V_S$ 111. As shown, one end of the inductor L1 136 is coupled to the output winding 110, in particular, the switching terminal of the output winding 110. As shown, one end of the inductor L1 136 is coupled between the output winding 110 and the output rectifier DO 114. The other end of inductor L1 136 is coupled to the anode end of diode D1 138. The cathode end of diode D1 138 is coupled to the bypass terminal BP 131 and the bypass capacitor 132. As shown, the inductive charging circuit 134 provides the bypass current $I_{BP}$ 180 to the bypass terminal BP 131 in response to the switching voltage, output winding voltage $V_S$ 111. In one example, the switching voltage received by the inductive charging circuit 134 may be a time varying voltage with an average value greater than the bypass voltage $V_{BP}$ 133. In another example, the switching voltage received by the inductive charging circuit 134 may be a pulsed voltage which is generated by the power converter and the operation of the power switch S1 112.

In operation, the inductive charging circuit filters the received switching voltage, output winding voltage $V_S$ 111 to provide the bypass current $I_{BP}$ 180 to the bypass terminal BP 131 of the second controller 124. The inductor L1 136 limits the peak value of the inductor current $I_{L1}$ 139 and ergo the bypass current $I_{BP}$ 180 to control the losses of the inductive charging circuit 134. The diode D1 138 is utilized to keep the current flowing from the input to the output of the inductive charging circuit 134. Inductive charging circuit 134 utilizes a switching voltage $V_S$ 111 generated by the power converter 100 at its input to provide the bypass current $I_{BP}$ 180, which allows the inductive charging circuit 134 to not utilize an active switch to generate its own switching voltage.

It should be appreciated that the second controller 124 could further include a linear regulator which is coupled between the output of power converter 100 to the bypass terminal BP 131 to regulate the voltage $V_{BP}$ 133 on bypass capacitor 132 from the output voltage $V_{OUT}$ 116. For example, if there is no bypass current $I_{BP}$ 180 or the bypass current $I_{BP}$ 180 is not sufficient for providing operating power to the second controller 124, the internal linear regulator turns on to provide the current and power top operate the second controller 124. However, as mentioned above, the linear regulator can result in excessive dissipation and increased thermals. With the inductive charging circuit 134, the inductive charging circuit 134 provides the bypass current $I_{BP}$ 180, which may allow the linear regulator to turn off. Further, the inductive charging circuit 134 may have less dissipation when providing the bypass current $I_{BP}$ 180 than the internal linear regulator.

Figure 2:
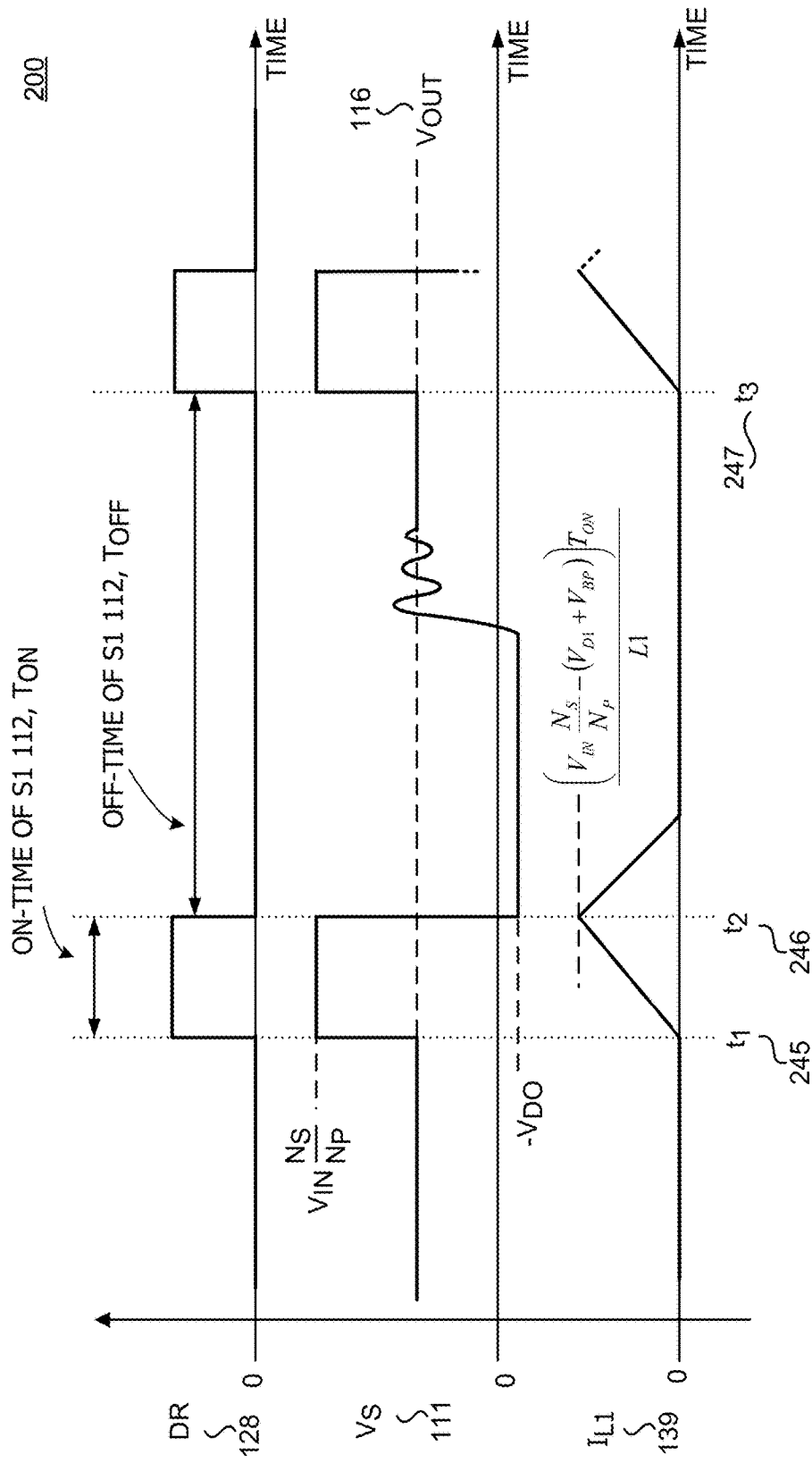
FIG. 2 is a timing diagram illustrating example waveforms of the power converter and inductive charging circuit of FIG. 1, in accordance with embodiments of the present disclosure.

FIG. 2 illustrates timing diagram 200 with example waveforms for the drive signal DR 128 of the power switch S1 112, output winding voltage $V_S$ 111 (e.g. input switching voltage for the inductive charging circuit 134), and inductor current $I_{L1}$ 139 (e.g. current of inductor L1 136).

In the example shown, at time $t_1$ 245, the drive signal DR 128 transitions to a logic high value, indicating the turn on of the power switch S1 112. As shown, logic high values for the drive signal DR 128 correspond to the power switch S1 112 being on while logic low values for the drive signal DR 128 correspond to the power switch S1 112 being off. Between times $t_1$ 245 and $t_2$ 246, the power switch S1 112 is on and the output winding voltage $V_S$ 111 (e.g. input switching voltage for the inductive charging circuit 134) is substantially equal to the input voltage $V_{IN}$ 102 multiplied by the turns ratio between the input winding 108 and the output winding 110 of the energy transfer element T1 106, e.g.

$$V_S = V_{IN} \frac{N_S}{N_P}$$

For the example shown in FIG. 2, the inductor current $I_{L1}$ 139 is substantially zero prior to the turn on of the power switch S1 112. The inductor current $I_{L1}$ 139 linearly increases between times $t_1$ 245 and $t_2$ 246 and the rate of increases is responsive to the voltage across the inductor $V_{L1}$ 140 between times $t_1$ 245 and $t_2$ 246 divided by the inductance of the inductor L1 136. The inductor voltage $V_{L1}$ 140 during the on-time $T_{ON}$ of power switch S1 112 (e.g. the duration of time between times $t_1$ 245 and $t_2$ 246) is substantially equal to:

$$V_{L1_{TON}} = V_N \frac{N_S}{N_P} - (V_{D1} + V_{BP}) \qquad (1)$$

The inductor current $I_{L1}$ 139 reaches its peak value at time $t_2$ 246, and is substantially equal to the inductor voltage $V_{L1}$ 140 between times $t_1$ 245 and $t_2$ 246 multiplied by the on-time $T_{ON}$ of power switch S1 112 (e.g. the duration between times $t_1$ 245 and $t_2$ 246) divided by the inductance L1. The inductor current at time $t_2$ 246 substantially equal to:

$$I_{L1\_T2} = \frac{V_{IN}\frac{N_S}{N_P}(V_{D1}+V_{BP})}{L1}T_{ON} \quad (2)$$

At time $t_2$ 246, the drive signal DR 128 transitions to a logic low value, indicating the turn off the power switch S1 112 and the beginning of the off-time $T_{OFF}$ of the power switch S1 112. The output winding voltage $V_S$ 111 is substantially equal to the negative value of the voltage of the output rectifier DO 114, e.g. $V_S = -V_{DO}$, while the output rectifier DO 114 is conducting. Once the output rectifier DO 114 stops conducting, a relaxation ring around the output voltage VOUT 116 can be observed in the output winding voltage $V_S$ 111. The relaxation ring generally occurs on the output winding 110 due to the secondary parasitic inductances and capacitances. As shown, the relaxation ring settles to the output voltage $V_{OUT}$ 116 during the off-time $T_{OFF}$ of the power switch S1 112. However, it should be appreciated that the relaxation ring may not settle during the entirety of the off-time $T_{OFF}$.

During the flyback time of the energy transfer element T1 106, in which the energy from the input of the power converter 100 is transferred to the output of the power converter 100, the inductor current $I_{L1}$ 139 decreases to substantially zero at a rate responsive to the inductor voltage $V_{L1}$ 140 during the flyback time divided by the value of inductor L1 136. As shown, the inductor current $I_{L1}$ 139 decreases to substantially zero prior to the turn on of the power switch S1 112 at time $t_3$ 247. For the example shown, the inductor voltage $V_{L1}$ 140 during the flyback time is substantially equal:

$$V_{L1\_FLYBACK} = V_{OUT} + V_{D1} + V_{BP} \quad (3)$$

The total charge delivered to the bypass terminal BP 131 during the on-time $T_{ON}$ of the power switch S1 112 is substantially equal to the inductor voltage $V_{L1}$ 140 during the on-time $T_{ON}$ (equation 1) multiplied by the on-time $T_{ON}$ squared divided by double the inductance L1, or mathematically:

$$Q_{TON} = \frac{V_{L1\_TON}T_{ON}^2}{2L1} \quad (4)$$

The total charge delivered to the bypass terminal BP 131 during the flyback/reset time of the inductor L1 136 is substantially equal to the inductor voltage $V_{L1}$ 140 during the on-time $T_{ON}$ (equation 1) multiplied by the inductor current $I_{L1}$ 139 at time $t_2$ 246 (equation 2) divided by double the inductor voltage $V_{L1}$ 140 during the flyback time/reset time (equation 3), or mathematically:

$$Q_{FLYBACK} = \frac{V_{L1\_TON}I_{L1\_T2}}{2V_{L1\_FLYBACK}} \quad (5)$$

At time $t_3$ 247, the drive signal DR 128 transitions to a logic high value and the power switch S1 112 is turned on. As shown, the output winding voltage $V_S$ 111 has settled to substantially the output voltage $V_{OUT}$ 116 and the inductor current $I_{L1}$ 139 is substantially zero prior to time $t_3$ 247. The switching period $T_{SW}$ of the power converter 100 is substantially the duration between time $t_1$ 245 and $t_3$ 247 with the switching frequency $f_{SW}$ as the reciprocal of the switching period $T_{SW}$. For the example of FIG. 1 and FIG. 2, the average bypass current $I_{BP}$ 180 provided to the bypass terminal BP 131 is substantially the sum of the total charge delivered to the bypass terminal BP 131 during the on-time $T_{ON}$ of the power switch S1 112 and the total charge delivered to the bypass terminal BP 131 during the flyback/reset time of the inductor L1 136 multiplied by the switching frequency $f_{SW}$ of the power converter 100, or mathematically:

$$I_{BP\_AVG} = (Q_{ON}+Q_{FLYBACK})f_{SW} \quad (6)$$

Figure 3:
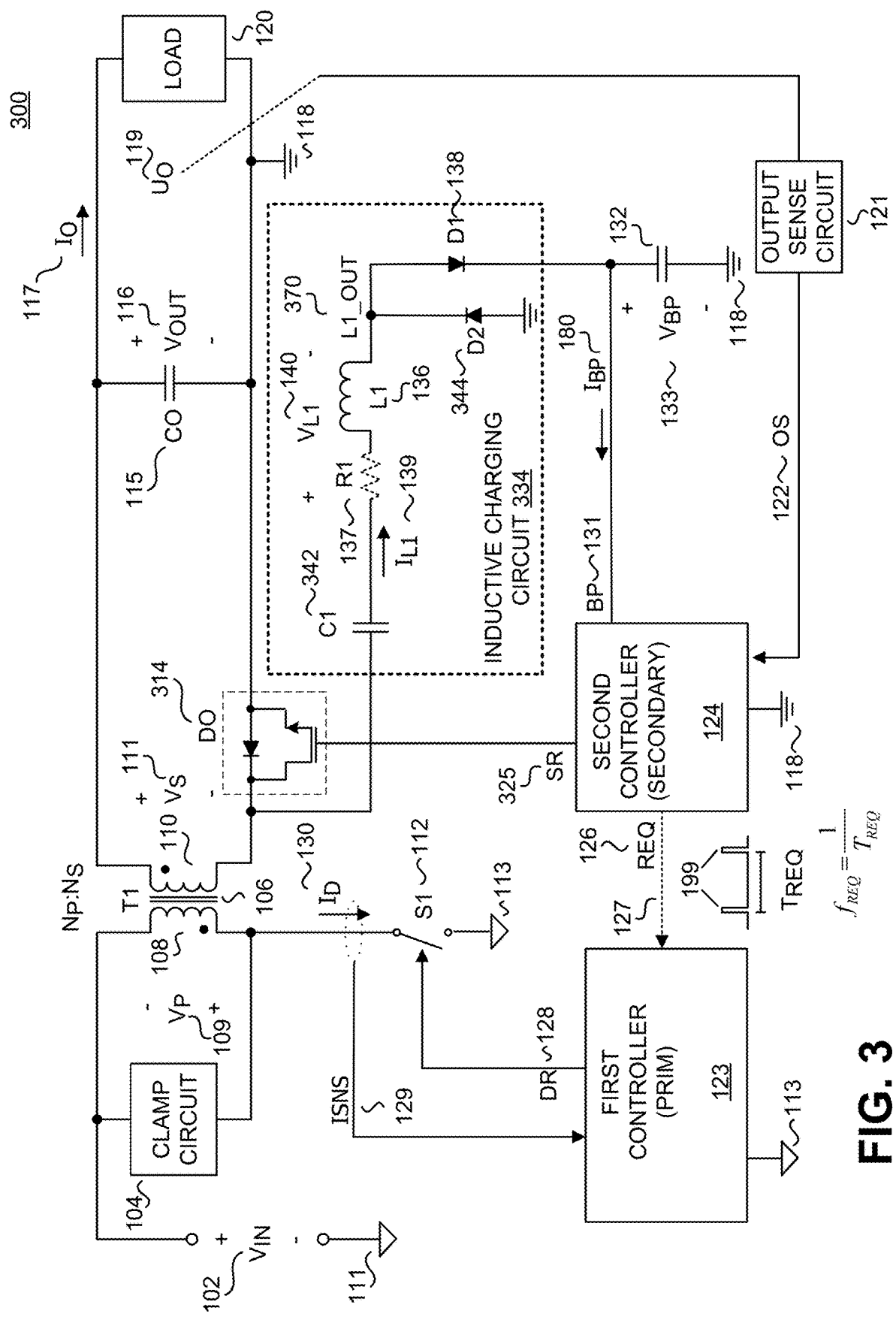
FIG. 3 is a schematic diagram of another example isolated power converter including an inductive charging circuit, in accordance with embodiments of the present disclosure.

FIG. 3 illustrates a power converter 300 including an inductive charging circuit 334 to provide bypass current $I_{BP}$ 180 for a bypass terminal BP 131, which provides supply to a second controller 124 (e.g. secondary controller) of the power converter 300, in accordance with an embodiment of the present disclosure. It should be appreciated that similarly named and numbered elements couple and function as described above. At least one difference however, is the output rectifier DO 314 of power converter 300 is exemplified as a transistor coupled as a synchronous rectifier. Further, the second controller 124 is configured to output the secondary drive signal SR 325 and the request signal REQ 126 in response to the output sense signal OS 122. The secondary drive signal SR 325 is received by the output rectifier DO 314 and controls the turn on and turn off of the output rectifier DO 314. In one example, the secondary drive signal SR 325 is a rectangular pulse waveform of varying lengths of logic high and logic low sections. Logic high sections may correspond with the output rectifier DO 314 being on while logic low sections correspond with the output rectifier DO 314 being off. Further, the period of the secondary drive signal SR 325 (e.g. the duration between consecutive leading or trailing edges in the secondary drive signal SR 325), may be referred to as the switching period $T_{SW}$ representative of the operation period of the power converter 300. In one example, the secondary drive signal SR 325 and the primary drive signal DR 128 have substantially the same switching period.

The second controller 124 and the inductive charging circuit 334 is further shown as coupled to a bypass capacitor 132 with bypass voltage $V_{BP}$ 133. The bypass capacitor 132 may filter the bypass current $I_{BP}$ 180 provided to the second controller 124. As shown, the inductive charging circuit 334 shares many similarities to the inductive charging circuit 134 of FIG. 1 and similarly named and numbered elements couple and function as described above. At least one difference however, is the inductive charging circuit 334 also includes capacitor C1 342 and diode D2 344. As will be further discussed, the capacitor C1 342 is configured as a dc blocking element and provides dc offset for the output voltage $V_{OUT}$ 116. Diode D2 344 is configured as a reset diode for capacitor C1 342.

The inductive charging circuit 334 includes capacitor C1 342, inductor L1 136, diode D1 138 and diode D2 344. Resistor R1 137 is shown in dashed lines to illustrate the parasitic resistance of the inductor L1 136. Further, the diode D1 138 may be considered a passive switch and other elements could be utilized.

The input of the inductive charging circuit 334 is coupled to the output winding 110 such that the input of the inductive charging circuit 334 receives a switching voltage, such as the output winding voltage $V_S$ 111. The input of the inductive charging circuit 334 is coupled between the output winding 110 and the output rectifier DO 314. As shown, the input of the inductive charging circuit 334 is coupled to the drain terminal of the output rectifier DO 314. The inductive charging circuit 334 is further coupled to the bypass capacitor 132 and a bypass terminal BP 131 of the second controller 124. In embodiments, the inductive charging circuit 334 provides a bypass current $I_{BP}$ 180 from a switching voltage (e.g. the voltage at the switching terminal of the output winding 110, output winding voltage $V_S$ 111) of the power converter 300 to provide operational power. In embodiments, the switching voltage, e.g. the output winding voltage $V_S$ 111, is generated by the power converter 300 due to the operation of the power switch S1 112.

As shown, one end of capacitor C1 342 is coupled to the output winding 110, in particular, the switching terminal of the output winding 110. In other words, one end of capacitor C1 342 is coupled between the output winding 110 and the output rectifier DO 314. The other end of the capacitor C1 342 is coupled to inductor L1 136. As such, the inductor L1 136 is capacitively coupled to the output winding 110. Similar to above, the cathode of diode D1 138 is coupled to the bypass terminal BP 131 and the bypass capacitor 132 while the anode of diode D1 138 is coupled to inductor L1 136. Diode D2 344 is also coupled to inductor L1 136. As shown, the cathode of diode D2 344 is coupled to the inductor L1 136 while the anode is coupled to output return 118. The node between the inductor and diodes D1 138 and D2 344 is labeled as L1_OUT 370.

As discussed above, the inductive charging circuit 334 provides the bypass current $I_{BP}$ 180 to the bypass terminal BP 131 in response to a received switching voltage, such as output winding voltage $V_S$ 111. In one example, the switching voltage received by the inductive charging circuit 334 may be a time varying voltage with an average value greater than the bypass voltage $V_{BP}$ 133. In another example, the switching voltage received by the inductive charging circuit 334 may be a pulsed voltage which is generated by the power converter and the operation of the power switch S1 112. For the example shown, the output winding voltage $V_S$ 111 may be a pulsed voltage which is generates by the power converter 300 due to the operation of the power switch S1 112. In other words, changes or variations in the output winding voltage $V_S$ 111 is responsive to turn on and turn off events of the power switch S1 112.

In operation, the inductive charging circuit 334 filters the received switching voltage, e.g. output winding voltage $V_S$ 111, to provide the bypass current $I_{BP}$ 180 to the bypass terminal BP 131 of the second controller 124. Capacitor C1 342 is configured as a dc blocking element which blocks dc current and provides a dc offset for the output voltage $V_{OUT}$ 116. The size of capacitor C1 342 may be chosen such that the resonance frequency of capacitor C1 342 with inductor L1 136 is below the maximum switching frequency $f_{SW}$ of power converter 300, and in some embodiments, substantially below the maximum switching frequency $f_{SW}$ of power converter 300. Inductor L1 136 limits the peak value of the inductor current $I_{L1}$ 139 and ergo the bypass current $I_{BP}$ 180, which may control the losses of the inductive charging circuit 334. The diode D1 138 is utilized to keep the current flowing from the input to the output of the inductive charging circuit 334. Diode D2 344 provides a path for the capacitor C1 342 to reset. Inductive charging circuit 334 utilizes a switching voltage which is generated by the power converter 300, e.g. output winding voltage $V_S$ 111, to provide the bypass current $I_{BP}$ 180 which allows the inductive charging circuit 334 to not utilize an active switch to generate its own switching voltage.

It should be appreciated that the second controller 124 could further include a linear regulator which is coupled between the output of power converter 300 to the bypass terminal BP 131 to regulate the voltage $V_{BP}$ 133 on bypass capacitor 132 from the output voltage $V_{OUT}$ 116. For example, if there is no bypass current $I_{BP}$ 180 or the bypass current $I_{BP}$ 180 is not sufficient for providing operating power to the second controller 124, the internal linear regulator turns on to provide the current and power to operate the second controller 124. However, as mentioned above, the linear regulator can result in excessive dissipation and increased thermals. With the inductive charging circuit 334, the inductive charging circuit 334 provides the bypass current $I_{BP}$ 180, which may allow the linear regulator to turn off. Further, the inductive charging circuit 334 may have less dissipation when providing the bypass current $I_{BP}$ 180 than the internal linear regulator.

Figure 4A:
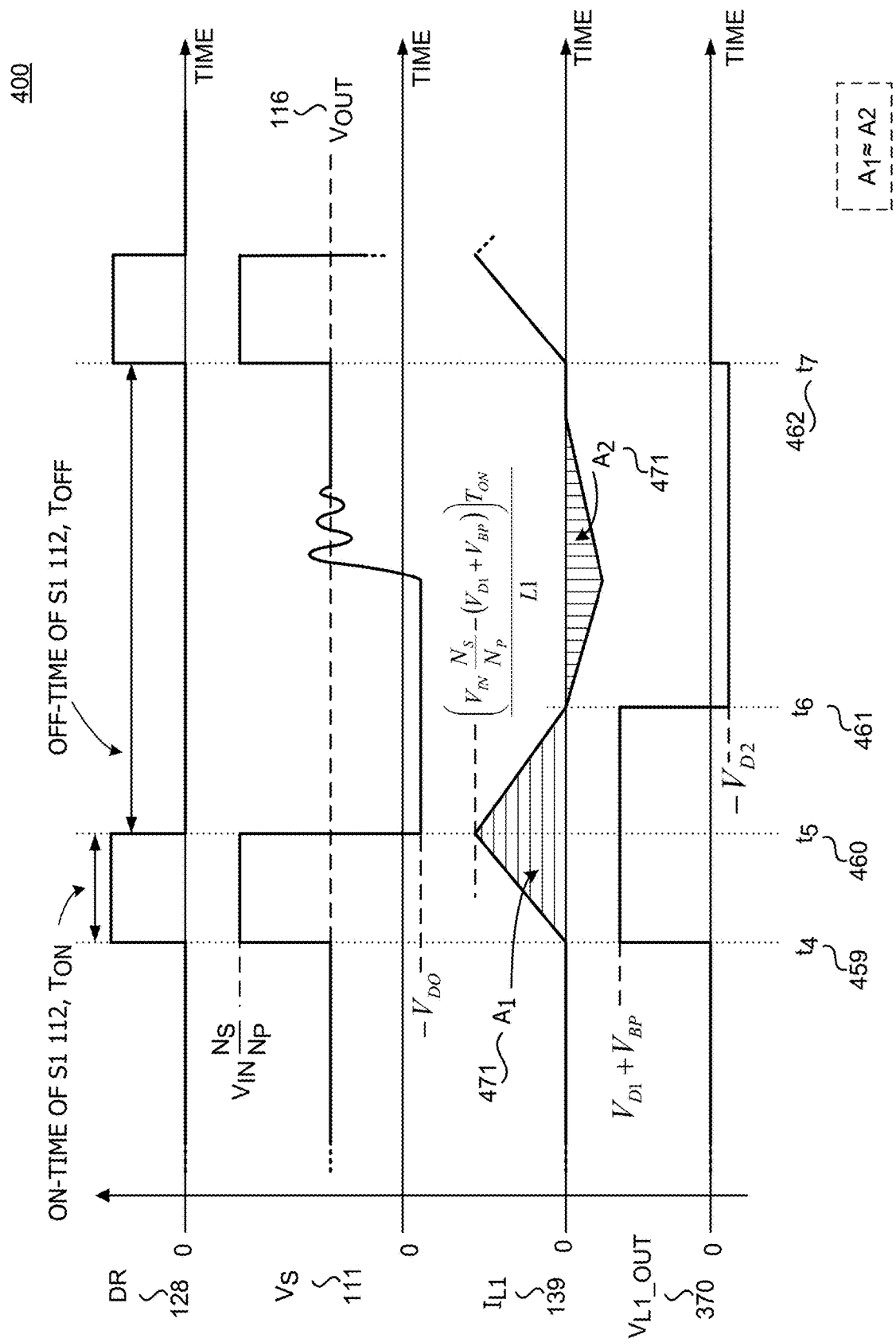
FIG. 4A is a timing diagram illustrating example waveforms of the power converter and inductive charging circuit of FIG. 3, in accordance with embodiments of the present disclosure.

FIG. 4A illustrates timing diagram 400 with example waveforms for the drive signal DR 128 of the power switch S1 112, output winding voltage $V_S$ 111 (e.g. input switching voltage for the inductive charging circuit 334), inductor current $I_{L1}$ 139 (e.g. current of inductor L1 136) and voltage at one end of inductor L1 136, e.g. voltage at node L1_OUT 370, $V_{L1\_OUT}$ 370.

Similar to what is discussed with respect to FIG. 2, at time $t_4$ 459, the drive signal DR 128 transitions to a logic high value, indicating the turn on of the power switch S1 112. As shown, logic high values for the drive signal DR 128 correspond to the power switch S1 112 being on while logic low values for the drive signal DR 128 correspond to the power switch S1 112 being off. Between times $t_4$ 459 and $t_5$ 460, the power switch S1 112 is on and the output winding voltage $V_S$ 111 (e.g. input switching voltage for the inductive charging circuit 134) is substantially equal to the input voltage $V_{IN}$ 102 multiplied by the turns ratio between the input winding 108 and the output winding 110 of the energy transfer element T1 106, e.g.

$$V_S = V_{IN} \frac{N_S}{N_P}.$$

For the example shown in FIG. 4A, the inductor current $I_{L1}$ 139 is substantially zero prior to the turn on of the power switch S1 112 at time $t_4$ 459. The inductor current $I_{L1}$ 139 linearly increases between times $t_4$ 459 and $t_5$ 460 and the rate of increases is responsive to the voltage across the inductor $V_{L1}$ 140 between times $t_4$ 459 and $t_5$ 460 divided by the inductance of the inductor L1 136. The inductor voltage $V_{L1}$ 140 during the on-time $T_{ON}$ of power switch S1 112 (e.g. the duration of time between times $t_4$ 459 and $t_5$ 460) is substantially equal to equation (1) discussed above. The inductor current $I_{L1}$ 139 reaches its peak value at time $t_5$ 460, and is substantially equal to the inductor voltage $V_{L1}$ 140 between times $t_4$ 459 and $t_5$ 460 multiplied by the on-time $T_{ON}$ of power switch S1 112 (e.g., the duration between times $t_4$ 459 and $t_5$ 460) divided by the inductance L1. Prior to time $t_4$ 459, the voltage at node L1_OUT 370 is substantially zero. Between times $t_4$ 459 and $t_5$ 460, the voltage at node L1_OUT 370 is substantially the sum of the bypass voltage $V_{BP}$ 133 and the first diode voltage $V_{D1}$.

At time $t_5$ 460, the drive signal DR 128 transitions to a logic low value, indicating the turn off the power switch S1 112 and the beginning of the off-time $T_{OFF}$ of the power switch S1 112. The output winding voltage $V_S$ 111 is substantially equal to the negative value of the voltage of the output rectifier DO 314, e.g. $V_S = -V_{DO}$, while the output rectifier DO 314 is conducting. Once the output rectifier DO 314 stops conducting, a relaxation ring around the output voltage $V_{OUT}$ 116 can be observed in the output winding voltage $V_S$ 111. The relaxation ring generally occurs on the output winding 110 due to the secondary parasitic inductances and capacitances. As shown, the relaxation ring settles to the output voltage $V_{OUT}$ 116 during the off-time $T_{OFF}$ of the power switch S1 112. However, it should be appreciated that the relaxation ring may not settle during the entirety of the off-time $T_{OFF}$.

The duration between times $t_5$ 460 and $t_6$ 461 illustrates the flyback time of the energy transfer element T1 106, in which the energy from the input of the power converter 300 is transferred to the output of the power converter 300, the inductor current $I_{L1}$ 139 decreases to substantially zero at a rate responsive to the inductor voltage $V_{L1}$ 140 during the flyback time divided by the value of inductor L1 136. Between times $t_5$ 460 and $t_6$ 461, the voltage at node L1_OUT 370 remains substantially the sum of the bypass voltage $V_{BP}$ 133 and the first diode voltage $V_{D1}$ as the inductor current $I_{L1}$ 139 flows towards diode D1 138.

At time $t_6$ 461, the flyback period for the energy transfer element T1 106 has completed and the reset time for capacitor C1 342 has begun. As shown, the inductor current $I_{L1}$ 139 is flowing away from diode D1 138. The rate of decrease for the inductor current $I_{L1}$ 139 also changes. The inductor current $I_{L1}$ 139 decreases and then increases to substantially zero prior to the power switch S1 112 turn on at time $t_7$ 462. The voltage at node L1_OUT 370 substantially falls to the negative second diode voltage, $-V_{D2}$ 344 and remains at the negative second diode voltage, $-V_{D2}$ 344 until the power switch S1 112 turns on at time $t_7$ 462. The area A1 471 under the inductor current $I_{L1}$ 139 waveform represent the charge supplied to the bypass terminal BP 131 between times $t_4$ 459 and $t_6$ 461. The area A2 471 under the inductor current $I_{L1}$ 139 waveform represents charge pulled from the bypass terminal BP 131 between times $t_6$ 461 and $t_7$ 462. It should be appreciated that the area A1 471 is substantially equal to the area A2 471 if the inductor current $I_{L1}$ 139 returns to zero prior to the turn on of the power switch S1 112 in the next cycle. Further, equations (1) through (5) with respect to FIG. 2 also apply for the inductive charging circuit 334 if the inductor current $I_{L1}$ 139 returns to zero prior to the turn on of the power switch S1 112 in the next cycle.

Figure 4B:
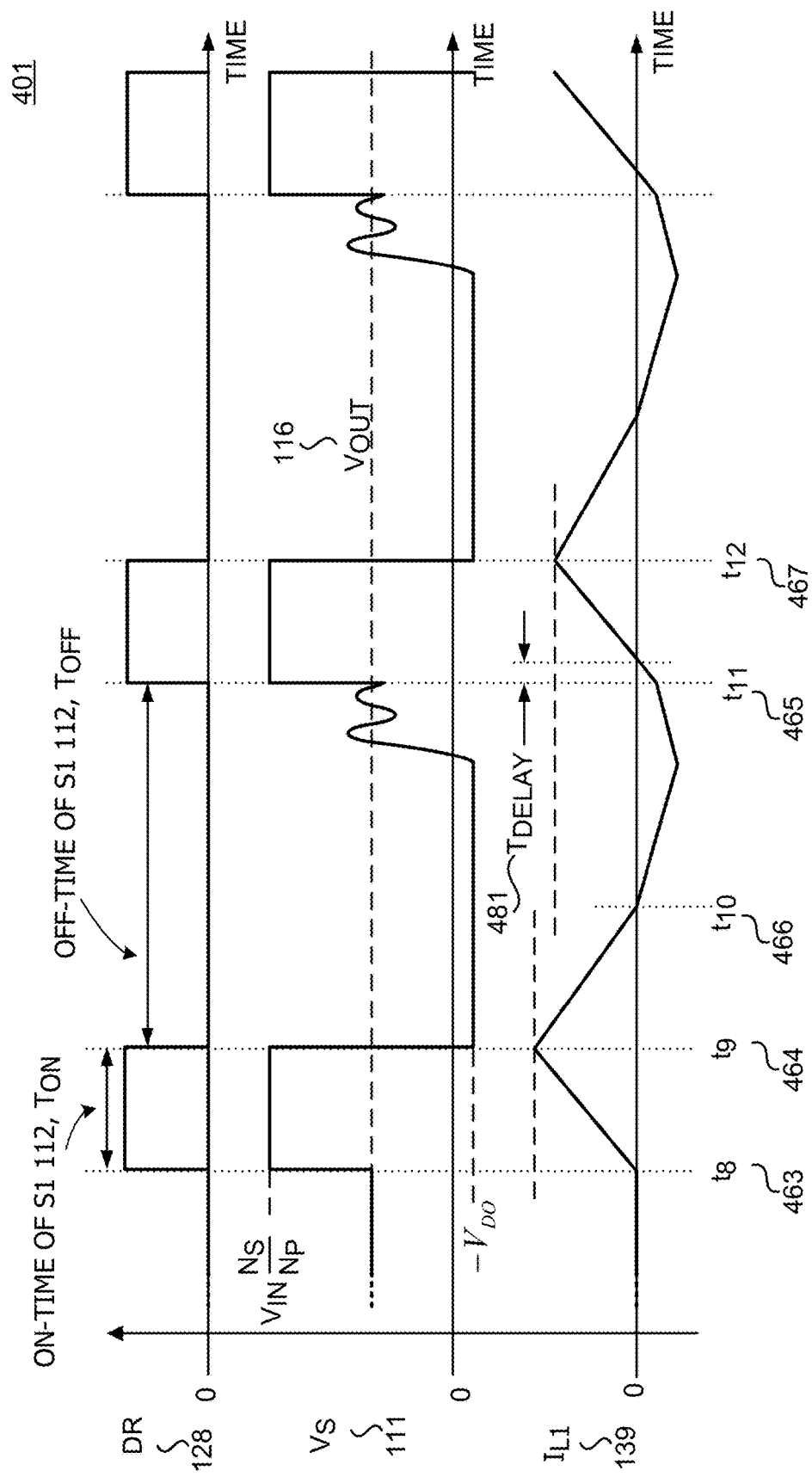
FIG. 4B is another timing diagram illustrating example waveforms of the power converter and inductive charging circuit of FIG. 3, in accordance with embodiments of the present disclosure.

FIG. 4B illustrates timing diagram 401 with example waveforms for the drive signal DR 128 of the power switch S1 112, output winding voltage $V_S$ 111 (e.g. input switching voltage for the inductive charging circuit 334), and inductor current $I_{L1}$ 139 (e.g. current of inductor L1 136). The waveforms for the drive signal DR 128 of the power switch S1 112, output winding voltage $V_S$ 111 (e.g. input switching voltage for the inductive charging circuit 334) and inductor current $I_{L1}$ 139 shown in the timing diagram 401 at times $t_8$ 463, $t_9$ 464, and $t_{10}$ 466 are similar to the similarly numbered waveforms shown in timing diagram 400 at times $t_4$ 459, $t_5$ 460, and $t_6$ 461. However, the inductor current $I_{L1}$ 139 does not return to zero prior to the power switch S1 112 turning on in the subsequent cycle.

At time $t_{11}$ 465, the drive signal DR 128 transitions to the logic high value and the power switch S1 112 turns on. Prior to time $t_{11}$ 465, the oscillations due to the relaxation ring for the output winding voltage $V_S$ 111. Once the power switch S1 112 turns on at time $t_{11}$ 465, the output winding voltage $V_S$ 111 increases to substantially the input voltage $V_{IN}$ multiplied by the turns ratio between the input winding 108 and the output winding 110. Further at time $t_{11}$ 465, the inductor current $I_{L1}$ 139 has not returned to zero. At time $t_{11}$ 465, the inductor current $I_{L1}$ 139 begins to increase at a rate responsive to the voltage across the inductor Vu 140 between time $t_{11}$ and time t12 divided by the value of inductor L1 136. As shown, the slope between time $t_{11}$ and time t12 should be substantially the same as the slope between time $t_8$ 463 and $t_9$ 464. However, since the inductor current $I_{L1}$ 139 is still negative when the power switch S1 112 turns on, there is a delay period $T_{DELAY}$ 481 measured as the time between the power switch S1 112 turning on and the duration for the inductor current $I_{L1}$ 139 to reach zero. Due to the delay period $T_{DELAY}$ 481, the peak value of the inductor current $I_{L1}$ 139 at time t12 467 is less than the peak value of the inductor current $I_{L1}$ 139 at time $t_9$ 464. The timing diagram 401 illustrates what could occur with the inductive charging circuit 334 when the switching period $T_{SW}$ decreases (e.g. the switching frequency $f_{SW}$ increases) for the power converter 300. In one embodiment, the switching period $T_{SW}$ decreases (e.g. the switching frequency $f_{SW}$ increases) as the load 120 increases.

Figure 5A:
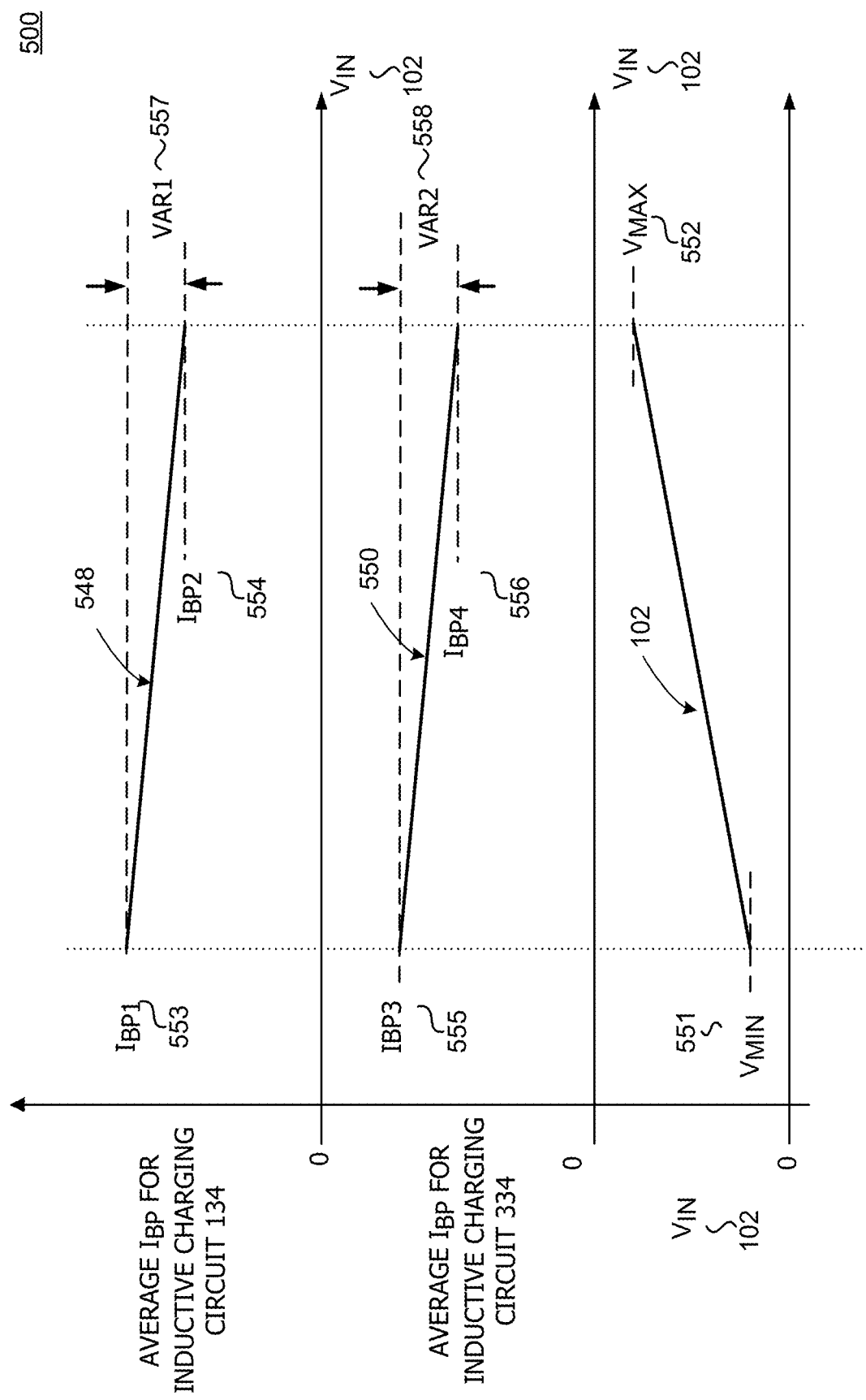
FIG. 5A is a graph illustrating average bypass current with input voltage for the inductive charging circuits of FIGS. 1 and 3, in accordance with embodiments of the present disclosure.

FIG. 5A illustrates graph 500 which compares the average provided bypass current $I_{BP}$ 180 for the inductive charging circuit 134 and the average provided bypass current $I_{BP}$ 180 for the inductive charging circuit 334 over a range of input voltages $V_{IN}$ 102. The graph 500 illustrates what could occur at lower switching frequency $f_{SW}$ as compared to the graph 501 shown in FIG. 5B.

As shown, the input voltage $V_{IN}$ 102 may vary between a minimum input voltage $V_{MIN}$ 551 and a maximum input voltage $V_{MAX}$ 552. At the minimum input voltage $V_{MIN}$ 551, the average bypass current $I_{BP}$ 180 for the inductive charging circuit 134 may be substantially equal to value IBP1 553 while the average bypass current $I_{BP}$ 180 for the inductive charging circuit 334 may be substantially equal to value IBP3 555.

As the input voltage $V_{IN}$ 102 increases to the maximum input voltage $V_{MAX}$ 552, the average bypass current $I_{BP}$ 180 for both the inductive charging circuit 134 and the inductive charging circuit 334 generally decreases (as shown by trends 548 and 550). At the maximum input voltage $V_{MAX}$ 552, the average bypass current $I_{BP}$ 180 for the inductive charging circuit 134 may be substantially equal to value IBP2 554 while the average bypass current $I_{BP}$ 180 for the inductive charging circuit 334 may be substantially equal to value IBP4 556. The difference between value IBP1 553 and the value IPB2 554 is the variance VAR1 557 of the average bypass current $I_{BP}$ 180 for the inductive charging circuit 134. The difference between value IBP3 555 and the value IPB5 556 is the variance VAR2 558 of the average bypass current $I_{BP}$ 180 for the inductive charging circuit 334. As illustrated in FIG. 5A, the variance trend for the inductive charging circuit 134 of FIG. 1 is similar to the variance trend for the inductive charging circuit 334 of FIG. 3.

Figure 5B:
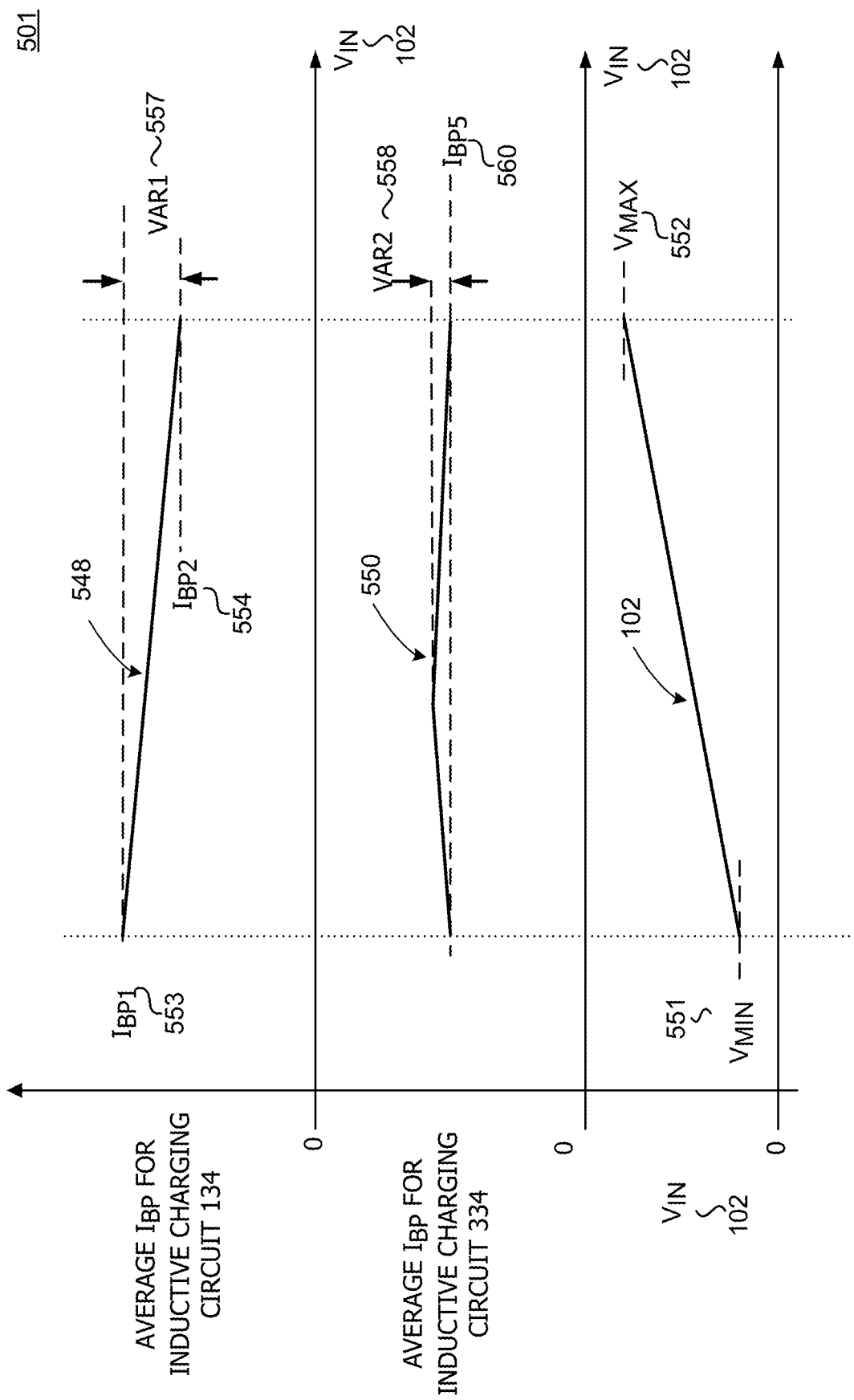
FIG. 5B is another graph illustrating average bypass current with input voltage for the inductive charging circuits of FIGS. 1 and 3, in accordance with embodiments of the present disclosure.

FIG. 5B illustrates graph 501 which compares the average provided bypass current $I_{BP}$ 180 for the inductive charging circuit 134 and the average provided bypass current $I_{BP}$ 180 for the inductive charging circuit 334 over a range of input voltages $V_{IN}$ 102. The graph 501 illustrates what could occur at higher switching frequencies $f_{SW}$ as compared to the graph 500 shown in FIG. 5A. In particular, the graph 501 illustrates the variance trend for the average bypass current $I_{BP}$ 180 for inductive charging circuit 334 if the switching frequencies $f_{SW}$ are high enough such that the inductor current $I_{L1}$ 139 does not reach zero prior to the turn on of the power switch S1 112 in the next cycle as shown in FIG. 4B.

The trend 548 for the average bypass current $I_{BP}$ 180 for the inductive charging circuit 134 is similar to what is shown with respect to FIG. 5A. However the trend 550 for the average bypass current $I_{BP}$ 180 for the inductive charging circuit 334 illustrates that the average bypass current $I_{BP}$ 180 is substantially equal to the value IBP5 560 at both the minimum input voltage $V_{MIN}$ 551 and the maximum input voltage $V_{MAX}$ 552. As shown, as the input voltage $V_{IN}$ 102 increases, the average bypass current $I_{BP}$ 180 for the inductive charging circuit 334 increases from the value IBP5 and then decreases back to the value IBP5. As such, the variance VAR2 558 for the average bypass current $I_{BP}$ 180 for the inductive charging circuit 334 in FIG. 5B is generally less than the variance for the average bypass current $I_{BP}$ 180 for the inductive charging circuit 334 shown in FIG. 5A.

Figure 6:
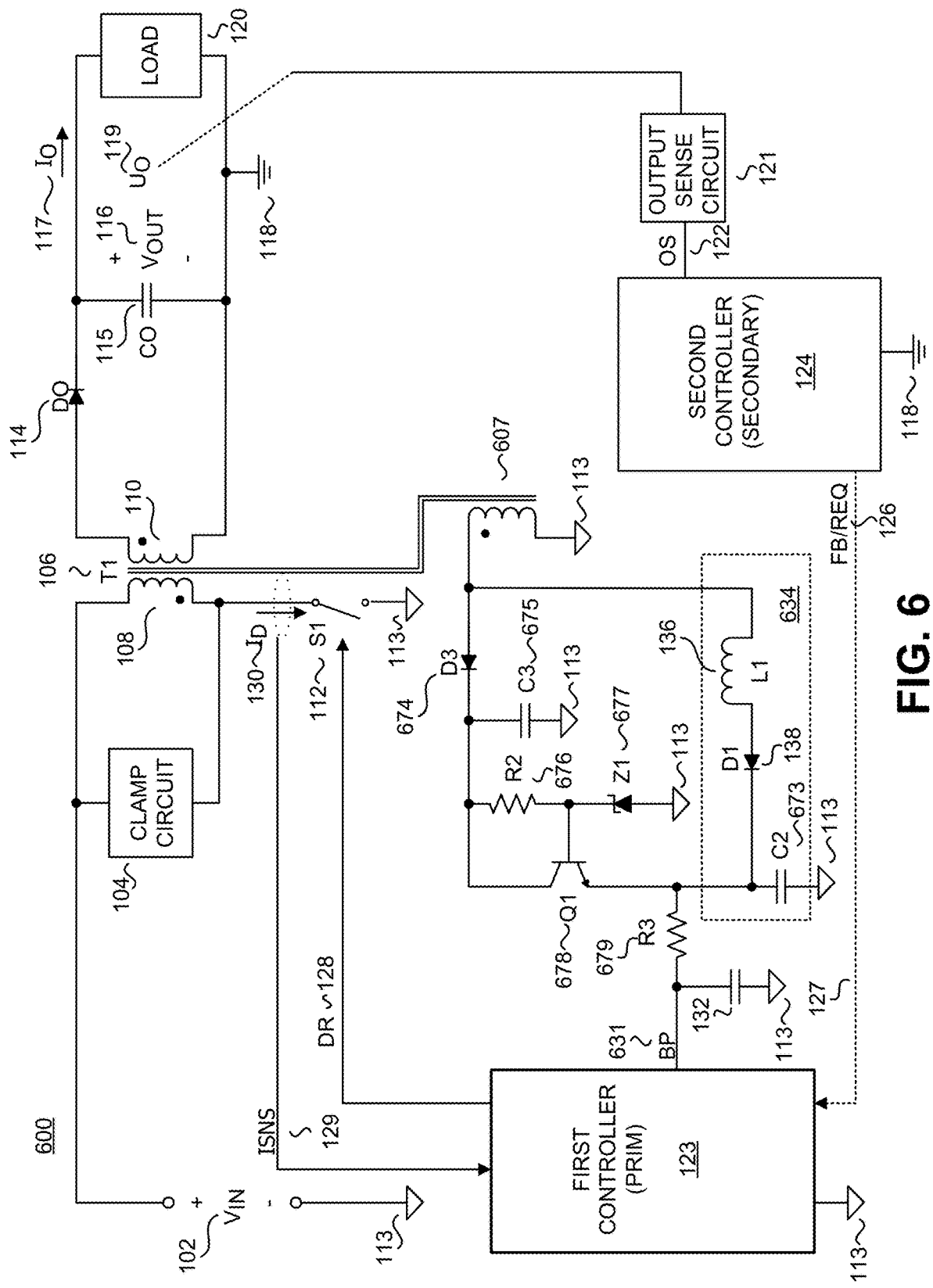
FIG. 6 is a schematic diagram of another example isolated power converter including an inductive charging circuit, in accordance with embodiments of the present disclosure.

FIG. 6 illustrates another example power converter 600 including an inductive charging circuit 634 to provide the bypass current $I_{BP}$ to a bypass terminal BP 631 which provides supply to a first controller 123 (e.g. primary controller) of the power converter 600, in accordance with an embodiment of the present disclosure. In other words, the inductive charging circuit 634 could be coupled to the input side of the power converter 600 to provide an efficient power source for the first controller 123 and provide operating current to the first controller 123.

It should be appreciated that the power converter 600 and inductive charging circuit 634 share many similarities with power converter 100 and inductive charging circuit 134 shown with respect to FIG. 1 and similarly named and numbered elements couple and function as described above. At least one difference, however, is the power converter 600 illustrates a third winding 607 of the energy transfer element T1 106 which is utilized as a source to provide operating power to the first controller 123. Further, the input of the inductive charging circuit 634 is coupled to the third winding 607 and the inductive charging circuit 634 provides the bypass current $I_{BP}$ from a switching voltage of the third winding 607 to a bypass terminal BP 631 to provide operational power to the first controller 123. As such, the bypass current $I_{BP}$ is derived from the switching voltage of the third winding 607. Further, the switching voltage of the third winding 607 is generated by the power converter 600 in response to the switching action of the power switch S1 112.

The third winding 607 in the example shown is an input referenced winding of the energy transfer element 106 and is coupled to input return 113. The other end of the third winding 607 is coupled to the input of the inductive charging circuit 634. The power converter 600 may also include diode D3 674, capacitor C3 675, resistor R2 676, Zener diode Z1 677 and transistor Q1 678 coupled together as a linear regulator to provide operation power to the first controller 123. The anode diode D3 674 is coupled to the third winding 607 while the cathode of diode D3 674 is coupled to capacitor C3 675 and resistor R2 676. The transistor Q1 678 is exemplified as a npn bipolar junction transistor (BJT). Resistor R2 676 is coupled across the collector and base terminals of the transistor Q1 678 while the Zener diode Z1 677 is coupled to the base of transistor Q1 678. Both the Zener diode Z1 677 and capacitor C3 675 are referenced to input return 113.

The power converter 600 also includes a resistor R3 679 and bypass capacitor 132 coupled to the bypass terminal BP 631 of the first controller. One end of resistor R3 679 is coupled to the bypass capacitor 132 and the bypass terminal BP 631 while the other end of resistor R3 679 is coupled to the emitter terminal of transistor Q1 678 and the inductive charging circuit 634.

The inductive charging circuit 634 is shown as including an inductor L1 136, diode D1 138 and capacitor C2 673. Similar to what was discussed above, one end of inductor L1 136 is coupled to the third winding 607 such that the inductive charging circuit 634 receives a switching voltage. The other end of inductor L1 136 is coupled to the anode of diode D1 138. As shown, the cathode of diode D1 138 and the capacitor C2 673 are coupled to resistor R3 679 and the emitter terminal of transistor Q1 678. Capacitor C2 673 is shown as referenced to input return 113.

In operation, the inductor L1 136, diode D1 138 and capacitor C2 673 of the inductive charging circuit 634 raises the voltage on the emitter terminal of transistor Q1 678 such that the transistor Q1 678 is turned off at high switching frequencies $f_{SW}$ of the power converter 600. When transistor Q1 678 is turned off, the bypass current $I_{BP}$ into the bypass terminal BP 631 is provided by the inductor L1 136 of the inductive charging circuit 634. However, at lower switching frequencies $f_{SW}$, the current provided by the inductor L1 136 may not be high enough to operate the first controller 123 or turn off the transistor Q1 678. As such, the linear regulator also provides operating current to the first controller 123. Resistor R3 679 may be configured to increase the discharge time of the capacitor C2 673.

Figure 7:
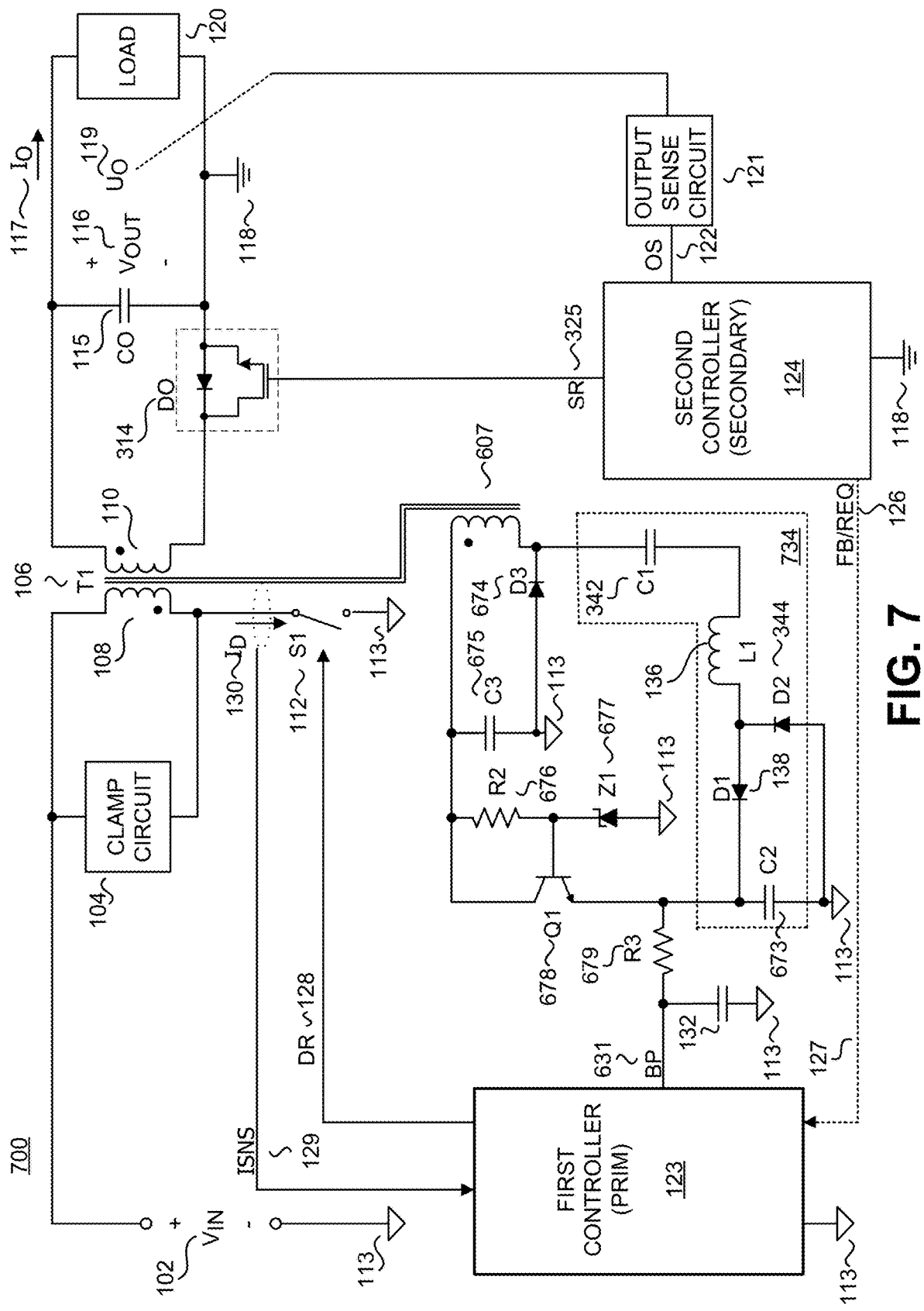
FIG. 7 is a schematic diagram of a further example isolated power converter including an inductive charging circuit, in accordance with embodiments of the present disclosure.

FIG. 7 illustrates another example power converter 700 including an inductive charging circuit 734 to provide the bypass current $I_{BP}$ to a bypass terminal BP 631 which provides supply to a first controller 123 (e.g. primary controller) of the power converter 700, in accordance with an embodiment of the present disclosure. In other words, the inductive charging circuit 734 could be coupled to the input side of the power converter 700 to provide an efficient power source for the first controller 123 and provide operating current to the first controller 123.

It should be appreciated that the power converter 700 and inductive charging circuit 734 share many similarities with power converters 300 and 600 and inductive charging circuits 334 and 634 as shown with respect to FIGS. 3 and 6, and similarly named and numbered elements couple and function as described above. At least one difference, however, is the power converter 700 illustrates the output rectifier DO 314 exemplified as a transistor coupled as a synchronous rectifier and the second controller 124 outputs the secondary drive signal SR 325 to control the turn on and turn off of the output rectifier DO 314. Further, similar to FIG. 6, power converter 700 illustrates the third winding 607 of the energy transfer element T1 106 which is utilized as a source to provide operating power to the first controller 123. The coupling of the linear regulator as discussed with respect to FIG. 6 is similar, however the cathode terminal of diode D3 674 is coupled to the third winding 607 while the anode terminal of diode D3 674 is coupled to capacitor C3 675 and input return 113.

The inductive charging circuit 734 is shown as including capacitor C1 342, inductor L1 136, diode D1 138, capacitor C2 673, and diode D2 344. Capacitor C1 342 and diode D2 344 are coupled to function as described above. For example, capacitor C1 342 is coupled to the third winding 607 as a dc blocking element. The other end of capacitor C1 342 is coupled to the inductor L1 136. Diode D2 344 provides a reset path for capacitor C1 342. In operation, the inductor L1 136, diode D1 138 and capacitor C2 673 of the inductive charging circuit 734 raises the voltage on the emitter terminal of transistor Q1 678 such that the of transistor Q1 678 is turned off at high switching frequencies $f_{SW}$ of the power converter 700. When transistor Q1 678 is turned off, the bypass current $I_{BP}$ into the bypass terminal BP 631 is provide by the inductor L1 136 of the inductive charging circuit 734. As such, the inductive charging circuit 734 may provide bypass current $I_{BP}$ to power the first controller 123.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

Although the present invention is defined in the claims, it should be understood that the present invention can alternatively be defined in accordance with the following examples:

Example 1

An inductive charging circuit coupled to a winding of a power converter and a supply terminal of a controller of the power converter, the inductive charging circuit comprising an input coupled to the winding, the input coupled to receive a switching voltage generated by the power converter; an inductor coupled to the input to provide an inductor current in response to the switching voltage; a first diode coupled to the inductor to enable the inductor current to flow from the input of the inductive charging circuit to an output of the inductive charging circuit; and the output of the inductive charging circuit coupled to the supply terminal of the controller, the output of the inductive charging circuit configured to provide an operational current responsive to the inductor current to the controller, the controller configured to control a power switch of the power converter to generate the switching voltage.

Example 2

The inductive charging circuit of example 1, wherein the winding of the power converter is an output winding on an output side of the power converter, the switching voltage is an output winding voltage generated by the turn on and turn off of the power switch of the power converter, and the controller is a second controller coupled to the output side of the power converter.

Example 3

The inductive charging circuit of example 1 or 2, wherein the input of the inductive charging circuit is coupled between the output winding and an output rectifier of the power converter.

Example 4

The inductive charging circuit of any one of examples 1 to 3, wherein the inductor is coupled between the output winding and the output rectifier of the power converter.

Example 5

The inductive charging circuit of any one of examples 1 to 4, further comprising a capacitor coupled as a dc blocking device between the input of the inductive charging circuit and the inductor; and a second diode coupled to the inductor and to the first diode to provide a reset path for the capacitor.

Example 6

The inductive charging circuit of any one of examples 1 to 5, wherein a capacitance of the capacitor is selected such that a resonance frequency of the capacitor and the inductor is less than a switching frequency of the power switch of the power converter.

Example 7

The inductive charging circuit of any one of examples 1 to 6, wherein the output of the inductive charging circuit is coupled to a bypass capacitor that is coupled to filter the operational current provided by the inductive charging circuit.

Example 8

The inductive charging circuit of any one of examples 1 to 7, wherein the winding of the power converter is a bias winding on an input side of the power converter, the switching voltage is a bias winding voltage generated by the turn on and turn off of the power switch of the power converter, and the controller is a first controller coupled to the input side of the power converter.

Example 9

The inductive charging circuit of any one of examples 1 to 8, wherein the input of the inductive charging circuit is coupled between the bias winding and an input of a regulator.

Example 10

The inductive charging circuit of any one of examples 1 to 9, further comprising a second capacitor coupled to the first diode and to the output of the inductive charging circuit to turn off a transistor of the regulator.

Example 11

The inductive charging circuit of any one of examples 1 to 10, wherein the output of the inductive charging circuit is coupled to a resistor, wherein the resistor is coupled to the supply terminal and to increase a discharge time of the second capacitor.

Example 12

The inductive charging circuit of any one of examples 1 to 11, further comprising a capacitor coupled as a dc blocking device between the input of the inductive charging circuit and the inductor; and a second diode coupled to the inductor and to the first diode to provide a reset path for the capacitor.

Example 13

A power converter, comprising an energy transfer element comprising an input winding coupled to an input of the power converter and an output winding coupled to an output of the power converter; a power switch coupled to the input of the power converter and the energy transfer element; a first controller coupled to the input of the power converter, the first controller configured to generate a first drive signal to control switching of the power switch to transfer energy between the input winding and the output winding of the energy transfer element, the first controller configured to receive a request signal and to generate the first drive signal in response to a request event in the request signal; an output rectifier coupled to the output winding of the energy transfer element; a second controller coupled to the output of the power converter, the second controller configured to generate the request event in the request signal in response to the output of the power converter; and an inductive charging circuit coupled to the output winding of the energy transfer element and configured to generate an operational current to be received by a supply terminal of the second controller, the inductive charging circuit comprising an input coupled to the output winding to receive a switching winding voltage generated by the power converter in response to the switching of the power switch; an inductor coupled to the input to generate an inductor current in response to the switching winding voltage; a first diode coupled to the inductor such that the inductor current flows from the input of the inductive charging circuit to an output of the inductive charging circuit; and the output of the inductive charging circuit coupled to the supply terminal of the second controller to provide the operational current responsive to the inductor current to the controller.

Example 14

The power converter of example 13, wherein the input of the inductive charging circuit is coupled between the output winding and the output rectifier.

Example 15

The power converter of example 13 or 14, wherein the inductor is coupled between the output winding and the output rectifier of the power converter.

Example 16

The power converter of any one of examples 13 to 15, further comprising: a capacitor coupled as a dc blocking device between the input of the inductive charging circuit and the inductor; and a second diode coupled to the inductor and to the first diode to provide a reset path for the capacitor.

Example 17

The power converter of any one of examples 13 to 16, wherein a capacitance of the capacitor is selected such that a resonance frequency of the capacitor and the inductor is less than a switching frequency of the power switch.

Example 18

The power converter of any one of examples 13 to 17, further comprising a bypass capacitor coupled to the supply terminal of the second controller and to the output of the inductive charging circuit, wherein the bypass capacitor filters the operational current provided by the inductive charging circuit.

Example 19

The power converter of any one of examples 13 to 18, further comprising a communication link between the second controller and the first controller, wherein the communication link provides galvanic isolation between the first controller and the second controller and is formed from a leadframe.

What is claimed is:

1. An inductive charging circuit coupled to a winding of a power converter and to a supply terminal of a controller of the power converter, the inductive charging circuit comprising:
   an input coupled to the winding, the input coupled to receive a switching voltage generated by the power converter;
   an inductor coupled to the input to provide an inductor current in response to the switching voltage;
   a first diode coupled to the inductor to enable the inductor current to flow from the input of the inductive charging circuit to an output of the inductive charging circuit, the output of the inductive charging circuit coupled to the supply terminal of the controller to provide an operational current responsive to the switching voltage, the controller coupled to control a power switch of the power converter to generate the switching voltage;
   a second capacitor coupled to the first diode and to the output of the inductive charging circuit to turn off a transistor of the regulator;
   a resistor coupled to the output of the inductive charging circuit, wherein the resistor is coupled to the supply terminal to increase a discharge time of the second capacitor;
   a capacitor coupled as a dc blocking device between the input of the inductive charging circuit and the inductor; and
   a second diode coupled to the inductor and to the first diode to provide a reset path for the capacitor.

2. The inductive charging circuit of claim 1, wherein the winding of the power converter is an output winding on an output side of the power converter, the switching voltage is an output winding voltage generated by the turn on and turn off of the power switch of the power converter, and the controller is a second controller coupled to the output side of the power converter.

3. The inductive charging circuit of claim 2, wherein the input of the inductive charging circuit is coupled between the output winding and an output rectifier of the power converter.

4. The inductive charging circuit of claim 3, wherein the inductor is coupled between the output winding and the output rectifier of the power converter.

5. The inductive charging circuit of claim 3, further comprising:
   a capacitor coupled as a dc blocking device between the input of the inductive charging circuit and the inductor; and
   a second diode coupled to the inductor and to the first diode to provide a reset path for the capacitor.

6. The inductive charging circuit of claim 5, wherein a capacitance of the capacitor is selected such that a resonance frequency of the capacitor and the inductor is less than a switching frequency of the power switch of the power converter.

7. The inductive charging circuit of claim 1, wherein the output of the inductive charging circuit is coupled to a bypass capacitor that is coupled to filter the operational current provided by the inductive charging circuit.

8. The inductive charging circuit of claim 1, wherein the winding of the power converter is a bias winding on an input side of the power converter, the switching voltage is a bias winding voltage generated by the turn on and turn off of the power switch of the power converter, and the controller is a first controller coupled to the input side of the power converter.

9. The inductive charging circuit of claim 8, wherein the input of the inductive charging circuit is coupled between the bias winding and an input of a regulator.

10. A power converter, comprising:
an energy transfer element comprising an input winding coupled to an input of the power converter and an output winding coupled to an output of the power converter;
a power switch coupled to the input of the power converter and the energy transfer element;
a first controller coupled to the input of the power converter, the first controller coupled to generate a first drive signal to control switching of the power switch to transfer energy between the input winding and the output winding of the energy transfer element, the first controller further coupled to receive a request signal and to generate the first drive signal in response to a request event in the request signal;
an output rectifier coupled to the output winding of the energy transfer element;
a second controller coupled to the output of the power converter, the second controller coupled to generate the request event in the request signal in response to the output of the power converter;
an inductive charging circuit coupled to the output winding of the energy transfer element, the inductive charging circuit coupled to generate an operational current to be received by a supply terminal of the second controller, the inductive charging circuit comprising:
an input coupled to the output winding to receive a switching winding voltage generated by the power converter in response to the switching of the power switch;
an inductor coupled to the input to generate an inductor current in response to the switching winding voltage;
a first diode coupled to the inductor such that the inductor current flows from the input of the inductive charging circuit to an output of the inductive charging circuit, wherein the output of the inductive charging circuit is coupled to the supply terminal of the second controller to provide the operational current responsive to the switching voltage; and
a bypass capacitor coupled to the supply terminal of the second controller and to the output of the inductive charging circuit, wherein the bypass capacitor filters the operational current provided by the inductive charging circuit.

11. The power converter of claim 10, wherein the input of the inductive charging circuit is coupled between the output winding and the output rectifier.

12. The power converter of claim 11, wherein the inductor is coupled between the output winding and the output rectifier of the power converter.

13. The power converter of claim 10, further comprising:
a capacitor coupled as a dc blocking device between the input of the inductive charging circuit and the inductor; and
a second diode coupled to the inductor and to the first diode to provide a reset path for the capacitor.

14. The power converter of claim 13, wherein a capacitance of the capacitor is selected such that a resonance frequency of the capacitor and the inductor is less than a switching frequency of the power switch.

15. The power converter of claim 10, further comprising a communication link between the second controller and the first controller, wherein the communication link provides galvanic isolation between the first controller and the second controller and is formed from a leadframe.

* * * * *